United States Patent
Son et al.

(10) Patent No.: US 10,957,911 B2
(45) Date of Patent: Mar. 23, 2021

(54) NEGATIVE ELECTRODE COMPRISING MULTIPLE PROTECTION LAYERS AND LITHIUM SECONDARY BATTERY COMPRISING SAME

(71) Applicant: LG CHEM, LTD., Seoul (KR)

(72) Inventors: Byoungkuk Son, Daejeon (KR); Minchul Jang, Daejeon (KR); Junghun Choi, Daejeon (KR); Da Young Sung, Daejeon (KR); Se Ho Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 154 days.

(21) Appl. No.: 16/089,978

(22) PCT Filed: Sep. 7, 2017

(86) PCT No.: PCT/KR2017/009807
§ 371 (c)(1),
(2) Date: Sep. 28, 2018

(87) PCT Pub. No.: WO2018/056615
PCT Pub. Date: Mar. 29, 2018

(65) Prior Publication Data
US 2020/0127293 A1    Apr. 23, 2020

(30) Foreign Application Priority Data

Sep. 21, 2016  (KR) .................. 10-2016-0120602
Jul. 20, 2017  (KR) .................. 10-2017-0092180

(51) Int. Cl.
*H01M 4/62*    (2006.01)
*H01M 4/36*    (2006.01)
(Continued)

(52) U.S. Cl.
CPC .......... *H01M 4/628* (2013.01); *H01M 4/366* (2013.01); *H01M 4/382* (2013.01);
(Continued)

(58) Field of Classification Search
CPC .......... H01M 10/052; H01M 10/4235; H01M 2004/027; H01M 4/366; H01M 4/382; H01M 4/62; H01M 4/628
See application file for complete search history.

(56) References Cited

U.S. PATENT DOCUMENTS

| 5,569,520 A | 10/1996 | Bates |
| 5,648,187 A | 7/1997 | Skotheim |

(Continued)

FOREIGN PATENT DOCUMENTS

| CN | 103227344 A | 7/2013 |
| CN | 105074968 A | 11/2015 |

(Continued)

OTHER PUBLICATIONS

International Search Report, issued in PCT/KR2017/009807, dated Jan. 4, 2018.
(Continued)

*Primary Examiner* — Mayla Gonzalez Ramos
(74) *Attorney, Agent, or Firm* — Birch, Stewart, Kolasch & Birch, LLP

(57) ABSTRACT

The present invention relates to a negative electrode including a multi-protective layer and a lithium secondary battery including the same. The multi-protective layer is capable of effectively transferring lithium ions to a lithium metal electrode while physically suppressing lithium dendrite growth on the electrode surface, and does not cause an overvoltage during charge and discharge since the protective layer itself does not function as a resistive layer due to excellent ion conductivity of the multi-protective layer, and therefore, is (Continued)

capable of preventing battery performance decline and securing stability during battery operation.

5 Claims, 1 Drawing Sheet

(51) Int. Cl.
*H01M 4/38* (2006.01)
*H01M 10/052* (2010.01)
*H01M 10/42* (2006.01)
*H01M 4/02* (2006.01)

(52) U.S. Cl.
CPC ..... *H01M 10/052* (2013.01); *H01M 10/4235* (2013.01); *H01M 2004/027* (2013.01)

(56) References Cited

U.S. PATENT DOCUMENTS

| | | | |
|---|---|---|---|
| 5,731,104 A | 3/1998 | Ventura et al. | |
| 6,183,901 B1 | 2/2001 | Ying et al. | |
| 2007/0012244 A1 | 1/2007 | Klaassen | |
| 2007/0221265 A1* | 9/2007 | Affinito | H01M 4/02 136/243 |
| 2009/0280410 A1 | 11/2009 | Zaguib et al. | |
| 2013/0095380 A1 | 4/2013 | Affinito et al. | |
| 2014/0255780 A1 | 9/2014 | Mikhaylik et al. | |
| 2014/0272565 A1 | 9/2014 | Gronwald et al. | |
| 2014/0272594 A1 | 9/2014 | Safont Sempere et al. | |
| 2014/0377620 A1 | 12/2014 | Kwon et al. | |
| 2014/0377670 A1 | 12/2014 | Khiterer et al. | |
| 2015/0295246 A1* | 10/2015 | Son | H01M 4/134 429/163 |
| 2015/0318552 A1 | 11/2015 | Skotheim et al. | |
| 2016/0118638 A1 | 4/2016 | Gronwald et al. | |

FOREIGN PATENT DOCUMENTS

| | | | |
|---|---|---|---|
| JP | 2003-515893 A | 5/2003 | |
| JP | 2004-527888 A | 9/2004 | |
| JP | 2016-527679 A | 9/2016 | |
| JP | 2014-532281 A | 12/2018 | |
| KR | 10-0686948 B1 | 2/2007 | |
| KR | 10-1387855 B1 | 4/2014 | |
| KR | 10-2014-0132294 A | 11/2014 | |
| KR | 10-2014-0147686 A | 12/2014 | |
| KR | 10-2015-0030156 A | 3/2015 | |
| KR | 10-2015-0048911 A | 5/2015 | |
| KR | 10-2015-0132427 A | 11/2015 | |
| KR | 10-2015-0145046 A | 12/2015 | |
| KR | 10-1614885 B1 | 4/2016 | |
| KR | 10-2016-0052351 A | 5/2016 | |
| KR | 10-1621410 B1 | 5/2016 | |
| WO | WO 01/39302 A1 | 5/2001 | |
| WO | WO 01/39303 A1 | 5/2001 | |
| WO | WO 02/095849 A2 | 11/2002 | |
| WO | WO 2015/037867 A1 | 3/2015 | |

OTHER PUBLICATIONS

Extended European Search Report dated Jun. 28, 2019, for European Application No. 17853329.5.

* cited by examiner

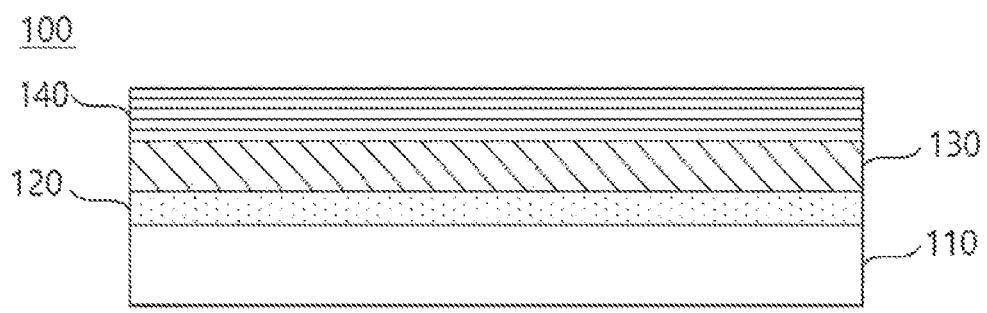

NEGATIVE ELECTRODE COMPRISING MULTIPLE PROTECTION LAYERS AND LITHIUM SECONDARY BATTERY COMPRISING SAME

TECHNICAL FIELD

This application claims priority to and the benefits of Korean Patent Application No. 10-2016-0120602, filed with the Korean Intellectual Property Office on Sep. 21, 2016, and Korean Patent Application No. 10-2017-0092180, filed with the Korean Intellectual Property Office on Jul. 20, 2017, the entire contents of which are incorporated herein by reference.

The present invention relates to a negative electrode including a multi-protective layer and a lithium secondary battery including the same, and in particular, to a negative electrode including a multi-protective layer capable of effectively suppressing dendrite growth and having high ion conductivity, and a lithium secondary battery including the same.

BACKGROUND ART

Interests in energy storage technologies have been increasingly higher recently. As applications have expanded to energy of mobile phones, camcorders and notebook PCs, and furthermore, to electric vehicles, efforts on the research and development of electrochemical devices have been more and more materialized.

Electrochemical devices are fields receiving most attentions in such aspects and among these, development of secondary batteries capable of charge and discharge have been the focus of attention, and in developing such batteries, research and development on the design of new electrodes and batteries for enhancing capacity density and energy efficiency have been recently progressed.

Among currently used secondary batteries, lithium secondary batteries developed in early 1990's have received attentions with advantages of having high operating voltage and significantly higher energy density compared to conventional batteries such as Ni-MH, Ni—Cd and sulfuric acid-lead batteries using an aqueous liquid electrolyte.

A lithium secondary battery has a structure of an electrode assembly including a positive electrode, a negative electrode and a separator provided between the positive electrode and the negative electrode being laminated or wound, and is formed by embedding this electrode assembly in a battery case, and injecting a non-aqueous liquid electrolyte thereinto. The lithium secondary battery produces electric energy through an oxidation and reduction reaction occurring when lithium ions are intercaiateddeintercaiated in the positive electrode and the negative electrode.

In a common lithium secondary battery, a negative electrode uses lithium metal, carbon and the like as an active material, and a positive electrode uses lithium oxides, transition metal oxides, metal chalcogen compounds, conductive polymers and the like as an active material.

Among these, a lithium secondary battery using lithium metal as a negative electrode mostly attaches lithium foil on a copper current collector, or uses a lithium metal sheet itself as an electrode. Lithium metal has low potential and high capacity, and has received much attention as a high capacity negative electrode material.

When using lithium metal as a negative electrode, electron density non-uniformization may occur on the lithium metal surface during battery operation due to various reasons. As a result, a branch-shaped lithium dendrite is produced on the electrode surface causing formation or growth of projections on the electrode surface, which makes the electrode surface very rough. Such lithium dendrite causes, together with battery performance decline, separator damages and battery short circuits in severe cases. As a result, a temperature in the battery increases causing a risk of battery explosion and fire.

In order to resolve such issues, studies such as introducing a polymer protective layer or an inorganic solid protective layer to a lithium metal layer, increasing a concentration of a salt of a liquid electrolyte, or using proper additives have been currently progressed. However, effects of lithium dendrite suppression of such studies are insignificant. Accordingly, modifying a form of the lithium metal negative electrode itself may become an effective alternative in resolving the problems.

PRIOR ART DOCUMENTS

Patent Documents (Patent Document 1) Korean Patent No. 10-1621410 "Lithium electrode and lithium secondary battery including the same"

(Patent Document 2) Korean Patent Application Laid-Open Publication No. 10-2016-0052351 "Lithium metal electrode having stable protective layer and lithium secondary battery including the same"

DISCLOSURE

Technical Problem

As described above, lithium dendrite of a lithium secondary battery is precipitated on a negative electrode surface and sometimes causes ceil volume expansion therefrom. As a result of extensive studies in view of the above, the inventors of the present invention have found out a way to resolve such a problem caused by dendrite through electrode structure modification, and have completed the present invention.

Accordingly, an aspect of the present invention provides a lithium secondary battery resolving a problem of cell volume expansion caused by lithium dendrite through electrode structure modification, and having enhanced battery performance.

Technical Solution

According to an aspect of the present invention, there is provided a negative electrode for a lithium secondary battery including a lithium metal layer; a first protective layer formed on the lithium metal layer and maintaining an interface with the lithium metal layer; a second protective layer formed on the first protective layer and physically suppressing dendrite growth; and a third protective layer formed on the second protective layer and supporting a structure of the second protective layer.

Herein, the first protective layer may have ion conductivity of $10^{-7}$ S/Cm or greater and liquid electrolyte uptake of 150% by weight or greater.

Herein, the first protective layer may include one or more selected from the group consisting of a poly(vinylidene fluoride-co-hexafluoropropylene) (PVdF-HFP) polymer, polyurethane-based polymers and polyacryl-based polymers.

Herein, the second protective layer may have Young's modulus of 5 GPa or greater, Li ion conductivity of $10^{-7}$ S/Cm or greater and liquid electrolyte uptake of 150% by weight or less.

Herein, the second protective layer may include one or more selected from the group consisting of lithium phosphorus oxynitride (LiPON), lithium boron oxynitride (LiBON), zirconium oxide, β-alumina, lithium super ionic conductor (LISICON)-based compounds, $Li_2S$—$P_2S_5$-based compounds, $Li_3N$, $LiI$, $Li_5NI_2$, $Li_3N$—$LiI$—$LiOH$, $LiSiC_4$, $LiS$—$SiS_2$, $LiI$—$LiOH$, $Li_2SiS_3$, $Li_4SiO_4$, $Li_4SiO_4$—$LiI$—$LiOH$, $Li_2S$, $Li_2S$—$SiS_2$, $Li_2S$—$GeS_2$, $Li_2S$—$B_2S_5$, $Li_2S$—$Al_2S_2$, $Li_2O$—$Al_2O_3$—$TiO_2$—$P_2O_5$ (LATP), $CaF_2$, $AgI$, $RbAg_4I_5$, a PVdF-HFP polymer, polyurethane-based polymers, polypropylene-based polymers and polycarbonate-based polymers.

Herein, the third protective layer may have ion conductivity of $10^{-5}$ S/Cm or greater and liquid electrolyte uptake of 150% by weight or less.

Herein, the third protective layer may include one or more selected from the group consisting of a PVdF-HFP polymer, polyurethane-based polymers and polyacryl-based polymers.

According to another aspect of the present invention, there is provided a negative electrode for a lithium secondary battery including a lithium metal layer; and three or more layers independently selected from the group consisting of a dendrite growth suppression layer, a single ion conductive layer and a polymer layer.

Herein, the dendrite growth suppression layer may include one or more selected from the group consisting of a PVdF-HFP polymer, LiPON, LiBON, polyurethane-based polymers, polypropylene-based polymers and polycarbonate-based polymers.

According to another aspect of the present invention, there is provided a lithium secondary battery including the negative electrode.

Advantageous Effects

A multi-protective layer according to the present invention is capable of effectively transferring lithium ions to a lithium metal electrode while physically suppressing lithium dendrite growth on the electrode surface, and does not cause an overvoltage during charge and discharge since the protective layer itself does not function as a resistive layer due to excellent ion conductivity of the multi-protective layer, and therefore, is capable of preventing battery performance decline and securing stability during battery operation.

Accordingly, a lithium electrode including the multi-protective layer provided in the present invention can be preferably used as a negative electrode of a lithium secondary battery, and this can be used in various devices, for example, from most small electronic devices to large capacity energy storage systems using lithium metal as a negative electrode.

DESCRIPTION OF DRAWINGS

FIG. 1 is a mimetic diagram of an electrode for a lithium secondary battery according to one embodiment of the present invention.

BEST MODE

Hereinafter, the present invention will be described in detail with reference to accompanying drawings so that those skilled in the art may readily implement the present invention. However, the present invention may be implemented in various different forms, and is not limited to the present specification.

The present invention provides a negative electrode for a lithium secondary battery (100) including a lithium metal layer (110); a first protective layer (120) formed on the lithium metal layer (110) and maintaining an interface with the lithium metal layer (110); a second protective layer (130) formed on the first protective layer (120) and physically suppressing dendrite growth; and a third protective layer (140) formed on the second protective layer (130) and supporting a structure of the second protective layer (130).

FIG. 1 is a diagram illustrating a negative electrode for a lithium secondary battery (100) according to one embodiment of the present invention.

When referring to FIG. 1, in the negative electrode for a lithium secondary battery (100) of the present invention, a first protective layer (120), a second protective layer (130) and a third protective layer (140) are consecutively formed on a lithium metal layer (110). In the diagram, a first protective layer (120), a second protective layer (130) and a third protective layer (140) are formed on only one surface of a lithium metal layer (110), however, these layers may be formed on both surfaces.

When using lithium metal as a battery negative electrode, problems as above are generally present. First, lithium explosively reacts with water as an alkali metal and therefore is difficult to prepare and use under general environments. Second, when using lithium as a negative electrode, the lithium reacts with an electrolyte, water, impurities in the battery, lithium salts and the like to produce a passive layer, and this layer causes a local current density difference forming dendritic lithium dendrite. In addition, the dendrite formed as above grows, passes between voids of a separator and may produce a direct internal short circuit with a positive electrode causing a phenomenon of battery explosion. Third, lithium is a soft metal and has weak mechanical strength, and its handling property is very poor to use without additional surface treatment.

In view of the above, by forming a first protective layer (120), a second protective layer (130) and a third protective layer (140) on a lithium metal layer (110), the present invention is capable of preventing dendrite growth.

According to one embodiment of the present invention, plate-shaped metals may be used as the lithium metal layer (110), and a width of the lithium metal layer (110) may be adjusted depending on the electrode form so as to readily prepare the electrode. The lithium metal layer may have a thickness of 1 μm to 50 μm.

The first protective layer (120), the second protective layer (130) and the third protective layer (140) are laminated on the lithium metal layer (110), and for smooth migration of lithium ions between the lithium metal layer (110) and an electrolyte, ion conductivity for the lithium ions may be basically required. Accordingly, the three protective layers all preferably have Li ion conductivity of at least $10^{-7}$ S/Cm or greater.

In addition, the first protective layer (120), the second protective layer (130) and the third protective layer (140) each have a role to be described later in the triple laminated structure, and in such a triple laminated structure, effects of suppressing dendrite growth and effects of maintaining ion conductivity may be the best.

In addition, the protective layer may require liquid electrolyte uptake above or below a certain range. The first protective layer may have liquid electrolyte uptake of 150% or greater, and the second protective layer and the third protective layer may have liquid electrolyte uptake of 150%$ or less.

Herein, the liquid electrolyte uptake means how much the protective layer absorbs a liquid electrolyte, and represents how much a weight of the protective layer increases after absorbing a liquid electrolyte compared to a weight before the absorption. The first protective layer has liquid electrolyte uptake of 150% or greater and thereby may exhibit an ion conductivity increase, and may wrap growing lithium due to its physical flexibility, and therefore, may maintain an interface between the lithium metal layer and the second protective layer. The second protective layer and the third protective layer has liquid electrolyte uptake of 150% or less and has relatively solid properties, and may effectively suppress dendrite formation.

According to one embodiment of the present invention, the first protective layer (120) is formed on the lithium metal layer (110), and performs a role of maintaining an interface between the lithium metal layer (110) and the protective layer while charging and discharging a lithium ion battery.

The first protective layer (120) has Li ion conductivity of $10^{-7}$ S/Cm or greater, may have liquid electrolyte uptake of 150% by weight or greater and preferably 150% by weight to 250% by weight, and may include one or more selected from the group consisting of a PVdF-HFP polymer, polyurethane-based polymers and polyacryl-based polymers. The first protective layer (120) is relatively flexible physically due to high liquid electrolyte uptake, and may be suitable for maintaining an interface.

The HFP content in the PVdF-HFP may be 15% by weight or greater, the polyurethane-based polymer may have Shore hardness of 80 A or less, and the polyacryl-based polymer may have crosslink density of $10^{-4}$ molg or less. When the Shore hardness is too low, the amount of liquid electrolyte impregnation is too high causing an increase in the battery volume, and when the crosslink density is too high, ion conductivity decreases resulting in an increase in the resistance.

When the first protective layer (120) is not formed, an interface between the lithium metal layer (110) and the protective layer is not maintained in a lithium ion battery, and a decrease in the battery capacity may occur due to an increase in the resistance.

Accordingly, it is sufficient that the first protective layer (120) is coated to have a thickness enough to maintain the interface, and since the first protective layer being too thick causes an unnecessary increase in the electrode thickness, the first protective layer (120) may have a thickness of 1 μm to 10 μm.

According to one embodiment of the present invention, the second protective layer (130) is formed on the first protective layer (120), and performs a role of physically suppressing dendrite growth.

Accordingly, the second protective layer (130) preferably has strong physical strength and ion conductivity. The second protective layer (130) has Young's modulus of 5 GPa or greater, Li ion conductivity of $10^{-7}$ S/Cm or greater, and liquid electrolyte uptake of 150% by weight or less and preferably 30% by weight to 150% by weight.

In addition, the second protective layer (130) may include one or more selected from the group consisting of LiPON, LiBON, zirconium oxide, β-alumina, lithium super ionic conductor (LISICON)-based compounds, $Li_2S-P_2S_5$-based compounds, $Li_3N$, LiI, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, $Li_2S$, $Li_2S-SiS_2$, $Li_2S-GeS_2$, $Li_2S-B_2S_5$, $Li_2S-Al_2S_2$, $Li_2O-Al_2O_3-TiO_2-P_2O_5$ (LATP), $CaF_2$, AgI, $RbAg_4I_5$, PVdF-HFP polymer, polyurethane-based polymers, polypropylene-based polymers and polycarbonate-based polymers.

The HFP content in the PVdF-HFP may be 5% by weight or less, the polyurethane-based polymer may have Shore hardness of 75D or greater, and the polypropylene-based polymer may have porosity of 5% to 50%. The Shore hardness being less than the above-mentioned range may be difficult to physically suppress dendrite growth. In addition, the porosity being excessively low may cause a capacity decrease due to an increase in the resistance, and the porosity being too high may be difficult to suppress dendrite growth.

The Young's modulus is elastic modulus representing, when lengthening out an object from both sides, a degree of the object being lengthened and a degree of the object being deformed, and is also referred to as length modulus. The second protective layer (130) physically suppresses dendrite growth, and preferably has Young's modulus in a certain range or higher as a property. Methods of measuring Young's modulus are known to experts in the art, and one exemplary device used to measure Young's modulus is a universal testing machine.

The second protective layer (130) has conductivity as well as suppressing dendrite growth, and therefore, is capable of smoothly transferring lithium ions to an electrode lengthening a battery life time and enhancing battery performance.

In addition, the second protective layer (130) being too thin may be difficult to effectively suppress dendrite growth, and the second protective layer being too thick may cause a relative capacity loss due to an unnecessary increase in the thickness, and therefore, the second protective layer (130) may have a thickness of 1 μm to 10 μm According to one embodiment of the present invention, the third protective layer (140) is formed on the second protective layer (130), and performs a role of a support supporting a structure of the second protective layer (130). In other words, the third protective layer (140) performs a role of physically supporting the second protective layer (130).

The third protective layer (140) has ion conductivity of $10^{-5}$ S/Cm or greater, may have liquid electrolyte uptake of 150% by weight or less and preferably 10% by weight to 150% by weight, and may include one or more selected from the group consisting of a PVdF-HFP polymer, polyurethane-based polymers and polyacryl-based polymers.

The HFP content in the PVdF-HFP may be from 5% by weight to 15% by weight, the polyurethane-based polymer may have Shore hardness of 80 A to 75D, and the polyacryl-based polymer may have crosslink density of 0.01 McmJ or greater.

In addition, the third protective layer (140) being too thin may be difficult to support a structure of the second protective layer (130), and the third protective layer being too thick may cause a relative capacity loss due to an unnecessary increase in the thickness, and therefore, the third protective layer (140) may have a thickness of 1 μm to 10 μm.

To the polymer and the like included in the first protective layer, the second protective layer and the third protective layer, an electrolyte salt such as a lithium salt may be added to enhance Li ion conductivity, and the lithium salt is not limited as long as it is commonly used in a liquid electrolyte for a lithium secondary battery. For example, as an anion of the lithium salt, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be included.

Methods of forming the first protective layer (120), the second protective layer (130) and the third protective layer (140) are not particularly limited, and in the PVdF-HFP polymer, the polyurethane-based, the polyacryl-based and the polypropylene-based polymers and the like, the polymer or a monomer may be mixed with a solvent coating solution, and then reactive sputtering, microgravure coating, comma coating, slot die coating, spray coating, dip coating, flow coating or the like may be employed for forming the layers, however, the method is not limited thereto. In addition, a solid electrolyte such as the LiPON and the LiBON may be mixed in a powder state with a binder and the like, and then used.

According to one preferred embodiment of the present invention, the negative electrode for a lithium secondary battery may be prepared by laminating, on a lithium metal layer, a first protective layer including PVdF-HFP having HFP in 20% by weight, a second protective layer including LiPON, and a third protective layer including PVdF-HFP having HFP in 5% by weight, and a lithium electrode having such a structure may effectively suppress dendrite growth.

The electrode for a lithium secondary battery according to the present invention may have various widths and lengths depending on the form processed to a battery. As necessary, the electrode for a lithium secondary battery prepared to have various widths may be wound and cut to be used.

In addition, the present invention provides a negative electrode for a lithium secondary battery (100) including a lithium metal layer; and three or more layers independently selected from the group consisting of a dendrite growth suppression layer, a single ion conductive layer and a polymer layer.

The dendrite growth suppression layer means the second protective layer (130), and may include one or more selected from the group consisting of LiPON, LiBON, polyurethane-based polymers, polypropylene-based polymers and polycarbonate-based polymers.

The single ion conductive layer may include inorganic, organic, and mixed organic-inorganic polymeric materials. The term "single ion conductive layer" used in the present specification means a layer selectively or exclusively allowing a single load of cation passing. The single ion conductive layer has capability of transferring cations such as lithium ions selectively or exclusively, and for example, may include polymers disclosed in the U.S. Pat. No. 5,731,104 (Ventura et. ai.). In one embodiment, the single ion conductive layer may contain single ion conductive glass having conductivity for lithium ions. Among proper glass, those including a "modifier" part and a "network" part known in the art are included. Typically the modifier may be a metal oxide of a metal ion having conductivity among glass. Typically, the network forming agent may be a metal chalcogenide, for example, a metal oxide or sulfide.

In addition, the single ion conductive layer may include a glassy layer containing a glassy material including one or more selected from the group consisting of lithium silicate, lithium borate, lithium aluminate, lithium phosphate, lithium phosphorous oxynitride, lithium silicosulfide, lithium germanosulfide, lithium lanthanum oxide, lithium titanium oxide, lithium borosulfide, lithium aluminosulfide and lithium phosphosulfide. In one embodiment, the single ion conductive layer may contain lithium phosphorous oxynitride. An electrolyte film of lithium phosphorous oxynitride is disclosed in, for example, the U.S. Pat. No. 5,569,520 (Bates).

The polymer layer may include, although not limited thereto, one or more selected from the group consisting of electrically conductive polymers, ion conductive polymers, sulfonated polymers and hydrocarbon polymers. Examples of the suitable electrically conductive polymer include, although not limited thereto, poly(p-phenylene), polyacetylene, poly(phenylene vinylene), polyazulene, poly(perinaphthalene), polyacene and poly(naphthalene-2,6-diyl), and may include those described in the U.S. Pat. No. 5,648,187 (Skotheim). In addition, examples of the suitable ion conductive polymer may include ion conductive polymers known to be useful in solid polymer electrolytes and gel polymer electrolytes for lithium electrochemical batteries such as polyethylene oxide. Examples of the suitable sulfonated polymer may include sulfonated siloxane polymers, sulfonated polystyrene-ethylene-butylene polymers and sulfonated polystyrene polymers. In addition, examples of the suitable hydrocarbon polymer may include ethylene-propylene polymers, polystyrene polymers or the like.

In addition, the polymer layer may be a crosslinked polymer material formed from polymerizing a monomer including alkyl acrylate, glycol acrylate, polyglycol acrylate, polyglycol vinyl ether, polyglycol divinyl ether and those described in the US Patent Application Series No. 09399,967 (co-applicant Ying et. al.) for a protective coating layer for a separator layer. For example, the crosslinked polymer material may be polydivinyl poly(ethylene glycol). The crosslinked polymer material may further contain a salt, for example, a lithium salt in order to strengthen ion conductivity. In one embodiment, the multilayer-structured polymer layer may include a crosslinked polymer.

However, effective dendrite growth suppression may be difficult with just each of the above-mentioned layers, and effects of the dendrite growth suppression layer physically suppressing growth, the single ion conductive layer and the polymer layer supporting the suppression layer and helping stable suppression may be obtained. Accordingly, effects of dendrite growth suppression may become favorable when each of the above-mentioned layers are multiply laminated.

In addition, the present invention provides a lithium secondary battery including the negative electrode (100). In the lithium secondary battery according to the present invention, constitutions other than structures and characteristics of the negative electrode (100) described above may be prepared through known technologies by those skilled in the art, and hereinafter, specific descriptions will be provided.

A general lithium secondary battery includes a negative electrode; a positive electrode; a separator provided therebetween; and an electrolyte, and the negative electrode of a lithium secondary battery of the present invention may include a negative electrode including the multi-protective layer of the present invention.

The positive electrode may be prepared into a positive electrode form by filming a composition including a positive electrode active material, a conductor and a binder on a positive electrode current collector.

As the positive electrode active material, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}CoyO_2$, $LiCo_{1-y}MnyO_2$, $LiNi_{1-y}MnyO_2$ ($0\leq y<1$), $Li(Ni_aCo_bMn_c)O_4$ ($0<a<2$, $0<b<2$, $0<c<2$, $a+b+c=2$), $LiMn_{2-z}NizO_4$, $LiMn_{2-z}CozO_4$ ($0<z<2$), $LiCoPO_4$ and $LiFePO_4$, or a mixture of two or more types thereof may be used. In addition, sulfides, selenides, halides and the like may also be used in addition to such oxides. In more preferred examples, the positive electrode active material may be LiCoO$_2$ suited for high output batteries.

The conductor is a component for further enhancing conductivity of a positive electrode active material, and nonlimiting examples thereof may include graphite such as natural graphite or artificial graphite; carbon black such as carbon black, acetylene black, ketjen black, channel black, furnace black, lamp black and thermal black; conductive polymers such as carbon fibers or metal fibers; fluorocarbon, aluminum and metal powders such as nickel powder; conductive whiskers such as zinc oxide and potassium titanate; conductive metal oxides such as titanium oxide; conductive materials such as polyphenylene derivatives, and the like.

The binder has functions of keeping a positive electrode active material on a positive electrode current collector, and organically linking the positive electrode active materials, and examples thereof may include polyvinylidene fluoride (PVDF), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

The positive electrode composition may be coated on the positive electrode current collector using common methods known in the art, and for example, various methods such as a dipping method, a spray method, a roll coat method, a gravure printing method, a bar coat method, a die coating method, a comma coating method or a mixed method thereof may be used.

The positive electrode and the positive electrode composition that have gone through such a coating process go through solvent or dispersion medium evaporation, compactness of the coating layer and adhesion between the coating layer and the current collector using a drying process. Herein, the drying is carried out using a common method, and is not particularly limited.

The separator is not particularly limited in the material and as a material physically separating a positive electrode and a negative electrode and having electrolyte and ion penetrability those conwonly used as a separator in an electrochemical device may be used without particular limit. However as a material that is porous, nonconductive and insulating, those having an excellent liquid electrolyte moisture-containing ability while having low resistance for ion migration of the liquid electrolyte are particularly preferred. For example, a polyolefin-based porous membrane or a non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these may be used.

As the non-woven fabric other than the polyolefin-based non-woven fabric described above, a non-woven fabric formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, poiyetheretherketone, polyester and the like alone, or formed with a polymer mixing these may be used, and, as a fiber form forming a porous web, such a non-woven fabric includes a spunbond or meltblown form formed with long fibers.

The thickness of the separator is not particularly limited, but is preferably in a range of 1 μm to 100 μm, and more preferably in a range of 5 μm to 50 μm. When the separator has a thickness of less than 1 μm, mechanical properties may not be maintained, and when the thickness is greater than 100 μm, the separator functions as a resistive layer declining battery performance.

A pore size and porosity of the separator are not particularly limited, however, the pore size is preferably from 0.1 μm to 50 μm, and the porosity is preferably from 10% to 95%. When the separator has a pore size of less than 0.1 μm or porosity of less than 10%, the separator functions as a resistive layer, and when the pore size is greater than 50 μm or the porosity is greater than 95%, mechanical properties may not be maintained.

The electrolyte may be a non-aqueous liquid electrolyte or a solid electrolyte not reacting with lithium metal, but is preferably a non-aqueous electrolyte, and includes an electrolyte salt and an organic solvent.

The electrolyte salt included in the non-aqueous liquid electrolyte is a lithium salt. As the lithium salt, those commonly used in liquid electrolytes for a lithium secondary battery may be used without limit. For example, an anion of the lithium salt may include any one selected from the group consisting of F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$ and (CF$_3$CF$_2$SO$_2$)$_2$N$^-$, or two or more types thereof.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone, or as a mixture of two or more types. Among these, a carbonate compound that is cyclic carbonate, linear carbonate or a mixture thereof may be typically included. Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, a liquid electrolyte having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types among these may be used, however, the ester is not limited thereto.

The non-aqueous liquid electrolyte may be injected at a proper stage in an electrochemical device manufacturing process depending on manufacturing process and required properties of a final product. In other words, the non-aqueous liquid electrolyte may be injected at a stage prior to assembling an electrochemical device or at a final stage of electrochemical device assembly.

The lithium secondary battery according to the present invention may go through lamination (stack) and folding processes of a separator and an electrode in addition to winding, a general process. In addition, the battery case may be a cylinder-type, a square-type, a pouch-type, a coin-type or the like.

As described above, the lithium secondary battery including the negative electrode according to the present disclosure stably exhibits excellent discharge capacity, output property and capacity retention rate, and therefore, is useful in the fields of portable devices such as mobile phones, notebook computers or digital cameras, electric vehicles such as hybrid electric vehicles (HEV), and the like.

REFERENCE NUMERAL

100: Negative Electrode for Lithium Secondary Battery
110: Lithium Metal Layer
120: First Protective Layer
130: Second Protective Layer
140: Third Protective Layer Hereinafter, preferred examples and experimental examples are provided in order to illuminate the present invention. However, the following examples and experimental examples are for illuminating the present invention, and the present invention is not limited to the following examples and experimental examples.

Example 1

Manufacture of Lithium Secondary Battery Including Multi-Protective Layer-Coated Negative Electrode On a lithium metal plate negative electrode having a thickness of 20 μm, a first protective layer including PVdF-HFP having HFP in 20% by weight, a second protective layer including LiPON and a third protective layer including PVdF-HFP having HFP in 5% by weight were formed.

The first protective layer was formed to a thickness of 2 μm through preparing a solution in 20% by weight by adding PVdF-HFP having HFP in 20% by weight to an NMP solvent, coating the result on the lithium metal plate using slot die, and then drying the result for 30 minutes at 120° C.

The second protective layer was formed to a thickness of 1 μm by reactive sputtering a solution including LiPON on the first protective layer.

The third protective layer was formed to a thickness of 2 μm through preparing a solution in 10% by weight by adding PVdF-HFP having HFP in 5% by weight to an NMP solvent, coating the result on the second protective layer using slot die, and then drying the result for 30 minutes at 120° C.

In addition, a positive electrode was prepared using LCO ($LiCoO_2$) as a positive electrode active material. Slurry was prepared by mixing LCO:Super-P:PVDF in a weight ratio of 95:2.5:2.5 using N-methyl pyrrolidone (NMP) as a solvent, and the slurry was coated on aluminum foil having a thickness of 12 μm to prepare a positive electrode having a thickness of 70 μm.

After providing polyethylene having a thickness of 20 μm between the positive electrode and a negative electrode as a separator, a liquid electrolyte including 1.0 M $LiPF_6$ as a lithium salt and 2% by weight of vinylene carbonate (VC) as an additive in an ethylene carbonate (EC):diethyl carbonate (DEC):dimethyl carbonate (DMC)=1:2:1 (v/v) solvent was injected thereto to manufacture a lithium secondary battery.

Example 2

Manufacture of Lithium Secondary Battery Including Multi-Protective Layer-Coated Negative Electrode On a lithium metal plate negative electrode having a thickness of 20 μm, a first protective layer including polyurethane, a second protective layer including LiPON and a third protective layer including PVdF-HFP having HFP in 5% by weight were formed.

The first protective layer was formed to a thickness of 2 μm through preparing a solution in 20% by weight by adding polyurethane (Shore hardness 80 A) to an NMP solvent, coating the result on the lithium metal plate using slot die, and then drying the result for 30 minutes at 120° C.

The second protective layer was formed to a thickness of 1 μm by reactive sputtering a solution including LiPON on the first protective layer.

The third protective layer was formed to a thickness of 2 μm through preparing a solution in 10% by weight by adding PVdF-HFP having HFP in 5% by weight to an NMP solvent, coating the result on the second protective layer using slot die, and then drying the result for 30 minutes at 120° C. In addition, a positive electrode was prepared using LCO ($LiCoC_2$) as a positive electrode active material. Slurry was prepared by mixing LCO:Super-P:PVDF in a weight ratio of 95:2.5:2.5 using N-methyl pyrrolidone (NMP) as a solvent, and the slurry was coated on aluminum foil having a thickness of 12 μm to prepare a positive electrode having a thickness of 70 μm.

After providing polyethylene having a thickness of 20 μm between the positive electrode and a negative electrode as a separator, a liquid electrolyte including 1.0 M LiPFe as a lithium salt and 2% by weight of vinylene carbonate (VC) as an additive in an ethylene carbonate (EC):diethyl carbonate (DEC):dimethyl carbonate (DMC)=1:2:1 (v/v) solvent was injected thereto to manufacture a lithium secondary battery.

Example 3

Manufacture of Lithium Secondary Battery Including Multi-Protective Layer-Coated Negative Electrode On a lithium metal plate negative electrode having a thickness of 20 μm, a first protective layer including PVdF- HFP having HFP in 20% by weight, a second protective layer including LiBON and a third protective layer including PVdF-HFP having HFP in 5% by weight were formed.

The first protective layer was formed to a thickness of 2 μm through preparing a solution in 20% by weight by adding PVdF-HFP having HFP in 20% by weight to an NMP solvent, coating the result on the lithium metal plate using slot die, and then drying the result for 30 minutes at 120° C.

The second protective layer was formed to a thickness of 1 μm by reactive sputtering a solution including LiBON on the first protective layer.

The third protective layer was formed to a thickness of 2 μm through preparing a solution in 10% by weight by adding PVdF-HFP having HFP in 5% by weight to an NMP solvent, coating the result on the second protective layer using slot die, and then drying the result for 30 minutes at 120° C. In addition, a positive electrode was prepared using LCO ($LiCoO_2$) as a positive electrode active material. Slurry was prepared by mixing LCO:Super-P:PVDF in a weight ratio of 95:2.5:2.5 using N-methyl pyrrolidone (NMP) as a solvent, and the slurry was coated on aluminum foil having a thickness of 12 μm to prepare a positive electrode having a thickness of 70 μm.

After providing polyethylene having a thickness of 20 μm between the positive electrode and a negative electrode as a separator, a liquid electrolyte including 1.0 M LiPFe as a lithium salt and 2% by weight of vinylene carbonate (VC) as an additive in an ethylene carbonate (EC):diethyl carbonate (DEC):dimethyl carbonate (DMC)=1:2:1 (v/v) solvent was injected thereto to manufacture a lithium secondary battery.

Example 4

Manufacture of Lithium Secondary Battery Including Multi-Protective Layer-Coated Negative Electrode On a lithium metal plate negative electrode having a thickness of 20 μm, a first protective layer including PVdF-HFP having HFP in 20% by weight, a second protective layer including LiPON and a third protective layer including polyurethane were formed.

The first protective layer was formed to a thickness of 2 μm through preparing a solution in 20% by weight by adding PVdF-HFP having HFP in 20% by weight to an NMP solvent, coating the result on the lithium metal plate using slot die, and then drying the result for 30 minutes at 120° C. The second protective layer was formed to a thickness of 1 μm by reactive sputtering a solution including LiPON on the first protective layer.

The third protective layer was formed to a thickness of 2 μm through preparing a solution in 20% by weight by adding polyurethane (Shore hardness 75D) to an NMP solvent, coating the result on the second protective layer using slot die, and then drying the result for 30 minutes at 120° C.

In addition, a positive electrode was prepared using LCO ($LiCoO_2$) as a positive electrode active material. Slurry was prepared by mixing LCO:Super-P:PVDF in a weight ratio of 95:2.5:2.5 using N-methyl pyrrolidone (NMP) as a solvent, and the slurry was coated on aluminum foil having a thickness of 12 μm to prepare a positive electrode having a thickness of 70 μm.

After providing polyethylene having a thickness of 20 μm between the positive electrode and a negative electrode as a separator, a liquid electrolyte including 1.0 M $LiPF_6$ as a lithium salt and 2% by weight of vinylene carbonate (VC) as an additive in an ethylene carbonate (EC):diethyl carbonate (DEC):dimethyl carbonate (DMC)=1:2:1 (v/v) solvent was injected thereto to manufacture a lithium secondary battery.

Comparative Example 1

Manufacture of Lithium Secondary Battery Without Multi-Protective Layer

A lithium secondary battery was manufactured in the same manner as in Example 1, except that the first protective layer, the second protective layer and the third protective layer were not prepared and coated.

Comparative Example 2

Manufacture of Lithium Secondary Battery Without First Protective Layer

A lithium secondary battery was manufactured in the same manner as in Example 1, except that the first protective layer was not prepared and coated.

Comparative Example 3

Manufacture of Lithium Secondary Battery Without Second Protective Layer

A lithium secondary battery was manufactured in the same manner as in Example 1, except that the second protective layer was not prepared and coated.

Comparative Example 4

Manufacture of Lithium Secondary Battery Without Third Protective Layer

A lithium secondary battery was manufactured in the same manner as in Example 1, except that the third protective layer was not prepared and coated.

Experimental Example

Battery Performance Evaluation

For each of the batteries manufactured in Examples 1 to 4 and Comparative Examples performance evaluation was carried out. Herein charge and discharge conditions are as follows.

Charge: rate 0.2 C, voltage 4.25 V, CC/CV (5% current cut at 1 C)

Discharge: rate 0.5 C, voltage 3 V, CC

While repeating cycles under the above-mentioned condition, the number of cycles reaching 80% discharge capacity compared to initial capacity of the battery was measured, and the results are shown in the following Table 1

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Number of Cycles Reaching 80% Discharge Capacity (Times) | 198 | 181 | 195 | 196 | 75 | 76 | 105 | 153 |

As shown in Table 1, it was seen that, in Examples 1 to 4 using all of the first to the third protective layers, lithium dendrite growth was suppressed, and the number of cycles reaching 80% discharge capacity significantly increased compared to Comparative Examples 1 to 4.

In Comparative Example 2 that did not form the first protective layer, improvements in the cell performance was not obtained due to poor interface formation, and in Comparative Example 3 that did not form the second protective layer, the ability of suppressing dendrite growth declined due to a lack of strength. In Comparative Example 4 that did not form the third protective layer, battery performance declined while the second protective layer was destroyed during the cycle since the pressure caused by a volume change in the second protective layer due to dendrite growth suppression was not relieved. In Comparative Example 1, the protective layers of the present invention were not formed, and the number of cycles reaching 80% discharge capacity was the smallest. In other words, the battery of Example 1 of the present invention exhibited most superior performance.

The invention claimed is:

1. A negative electrode for a lithium secondary battery comprising:
    a lithium metal layer;
    a first protective layer including PVdF-HFP whose HFP content is 15% by weight or greater formed on the lithium metal layer and maintaining an interface with the lithium metal layer;
    a second protective layer formed on the first protective layer and physically suppressing dendrite growth; and
    a third protective layer including PVdF-HFP whose HFP content is from 5 to 15% by weight formed on the second protective layer and supporting a structure of the second protective layer,
    wherein the second protective layer includes one or more of lithium phosphorus oxynitride (LiPON), lithium boron oxynitride (LiBON), zirconium oxide, β-alumina, a lithium super ionic conductor (LISICON)-based compound, a $Li_2S$—$P_2S_5$-based compound, $Li_3N$, LiI $Li_5NI_2$, $Li_3N$—LiI—LiOH, $LiSiO_4$, $LiSiO_4$—LiILiOH, $Li_2SiS_3$, $Li_4SiO_4$, $Li_4SiO_4$—LiI—LiOH, $Li_2S$ $Li_2S$—$SiS_2$, $Li_2S$—$GeS_2$, $Li_2S$—$B_2S_5$, $Li_2S$-$Al_2S_2$, $Li_2O$—$Al_2O_3$—$TiO_2$—$P_2O_5$, $CaF_2$, AgI, $RbAg_4I_5$ a PVdF-HFP polymer, a polyurethane-based polymer, a polypropylene-based polymer and a polycarbonate-based polymer.

2. The negative electrode for a lithium secondary battery of claim 1, wherein the first protective layer has ion conductivity of $10^{-7}$ S/Cm or greater and liquid electrolyte uptake of 150% by weight or greater.

3. The negative electrode for a lithium secondary battery of claim 1, wherein the second protective layer has Young's modulus of 5 GPa or greater, Li ion conductivity of $10^{-7}$ S/Cm or greater and liquid electrolyte uptake of 150% by weight or less.

4. The negative electrode for a lithium secondary battery of claim 1, wherein the third protective layer has ion conductivity of $10^{-5}$ S/Cm or greater and liquid electrolyte uptake of 150% by weight or less.

5. A lithium secondary battery comprising the negative electrode of claim 1.

* * * * *